Feb. 18, 1964     G. L. MITTELSTEADT     3,121,466
STABILIZER MECHANISM FOR SCALE DEVICE
Filed Feb. 16, 1962

INVENTOR.
GLEN L. MITTELSTEADT
BY
*Williamson & Palmatier*
ATTORNEY

United States Patent Office 3,121,466
Patented Feb. 18, 1964

3,121,466
STABILIZER MECHANISM FOR SCALE DEVICE
Glen L. Mittelsteadt, Waseca, Minn., assignor to Herter's Inc., Waseca, Minn., a corporation of Minnesota
Filed Feb. 16, 1962, Ser. No. 173,792
6 Claims. (Cl. 177—157)

This invention relates to a scale device and more particularly to a mechanism for use in stabilizing the balance beam of a scale device during a weighing operation.

An object of this invention is the provision in a scale device of a novel stabilizing mechanism, of simple and inexpensive construction, for use in engaging the balance beam of a scale device to restrict oscillating movement thereof while positioning the balance means in a weight balancing position.

Another object of this invention is to provide a novel and improved stabilizer mechanism including a V-shaped socket member for use in combination with a scale device for engaging the scale balance beam to restrict oscillating movement thereof while positioning the same in weight balancing position to thereby permit the weighing operation to be conducted very rapidly and accurately.

A more specific object of this invention is to provide a scale device with a balance beam stabilizer mechanism of the class described which includes a V-shaped socket member mounted for pivotal movement between balance beam engaging and release positions, and including means for normally urging the socket member to a release position whereby a user may very rapidly and accurately weigh an object or material such as gun powder or the like.

These and other objects and advantages of this invention will more fully appear from the following description made in connection with the accompanying drawing wherein like character references refer to the same or similar parts throughout the various views, and in which.

Figure 1:
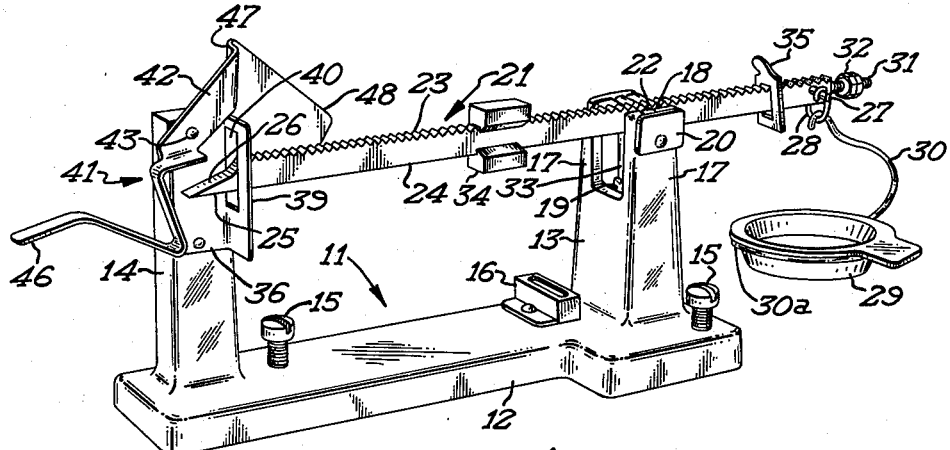
FIG. 1 is a perspective view of this invention.

Referring now to the drawing, it will be seen that one embodiment of this invention is illustrated in close combinative relationship with a scale device. This scale device, designated in its entirety by the reference numeral 10, includes a scale frame 11 which is preferably constructed of a suitable metallic material such as steel or the like. This scale frame 11 is comprised of a substantially horizontally disposed elongate frame base 12 having upstanding support member 13 and 14 respectively being integrally formed at opposite ends thereof. A plurality of adjustable foot support foot elements 15 threadedly engage the frame base 12 and depend therefrom. Although only one such support foot element 15 is illustrated as supporting the right end portion of the scale device 10 as viewed in FIG. 1, it is pointed out that a pair of such supporting foot elements 15 support this end of the scale device while the other end of the scale device is supported by a single foot. A level indicator 16 is secured to the base frame by any suitable means such as bolts or the like and this level indicator permits the scale frame to be levelled laterally. The scale frame 11 may also be levelled longitudinally and these levelling operations may be performed by adjusting the threaded supporting foot elements 15.

It will be seen that the upper end of the upstanding support member 13 is bifurcated to define a pair of laterally spaced apart arms 17. Each of these arms is provided with a V-shaped recess 18 for receiving the knife edge fulcrum element in a manner to be described hereinbelow. It will also be noted that the upstanding support member 13 has an upwardly opening receptacle 19 formed therein which is located between the bifurcated arm 17 and which preferably contains a suitable liquid such as oil or the like. It will also be noted that the upper portion of each of the bifurcated arms 17 is provided with a closure side plate 20 which is disposed in obstructing relation with respect to its associated V-shaped recess 18.

It will also be seen the scale device 10 includes an elongate scale balance beam 21 which is provided intermediate its ends with opposed, laterally extending knife edge fulcrum elements 22, the latter being received in the V-shaped fulcrum recesses 18 to permit vertical pivoting movement of the scale beam. The upper longitudinal edge 23 is serrated in a well known manner while the lower edge 24 thereof is substantially straight and smooth.

One end of the balance beam 21 defines a pointer 25. It will be noted that this pointer 25 has its lower edge coplanar and continuous with the straight lower edge 24 of the balance beam 21 but that the upper edge 26 of the pointer 25 diverges from the lower edge thereof as best seen in FIG. 1. The opposite end of the balance beam 21 has a pair of oppositely disposed laterally projecting lugs 27 to which is pivotally suspended a hanger element 28. Weighing pan 29 constructed of a suitable metallic material such as aluminum or the like is suspended from the hanger element 28 by means of a pan supporting suspension structure 30 which is constructed from a suitable wire element. It will be noted that the pan supporting suspension structure 30 has its lower end portion bent to define an annular ring 30a for suitably supporting the weighing pan 29 therein. The upper end portion of the pan supporting suspension structure 30 is disposed in detachable engagement with the hanger element 28.

The end of the balance beam 21 from whence the object to be weighed is suspended is also provided with a longitudinally extending threaded projection 31 which suitably supports a pair of nuts 32 and which serves to permit the lever arm of the balance beam 21 to be slightly adjusted in a well known manner. It will also be seen that the balance beam 21 is provided with a paddle element 33 which is affixed thereto and which extends therefrom and into a liquid containing receptacle 19. It will be seen that this paddle arm 19 will be caused to move through the liquid contained within the receptacle 19 when the balance beam is oscillating during the weighing operation and the resistance to movement of the paddle element 33 through the liquid serves to retard this oscillating movement of the balance beam. The balance beam 21 is also provided with a relatively large weight element 34 which is slidable along the beam 21 in the weighing operation. It will be noted that the weight element 34 is positioned on the beam 21 between the respective supports 13 and 14 and it will also be noted that a smaller weight element 35 has slidably positioned upon the balance beam 21 between the support member 13 and the end portion of the balance beam from whence is suspended the object or material to be weighed. It is also pointed out that the scale balance beam 21 is suitably calibrated, the calibrations being located on opposite sides of the support member 13 in the well known manner.

It is pointed out that the scale device 10 is generally of conventional construction and operation and one of the problems associated with the use of scale devices of this kind is the time needed during the weighing operation for a user to accomplish accurate weighing of an object or material. As is well known in the art, the balance beam 21 must be in a weight balancing condition in order for a user to make an accurate weight determination and balancing of the balance beam is accomplished by a trial and error procedure. During this operation, the balance beam 21 will oscillate during each step of the weighing operation and thus ordinarily causes the weighing operation to be a very time consuming procedure. To this end, means have been provided for stabilizing the balance beam 21 against oscillating movement during the weighing operation.

It will be seen that the upstanding support member 14 is provided with a substantially rectangular plate 36 affixed thereto adjacent the upper end thereof. This plate 36 is provided with a vertically disposed calibrated scale 37 having a reference indicia 38 as representing the point at which the scale beam will be in weight balancing condition. This plate 36 may be formed of any suitable rigid material such as aluminum or the like affixed to the support member 14 by any suitable securing means such as bolts. Plate 36 is bent in right-angular relationship to define an angularly disposed portion 39, the latter being positioned substantially normal to the longitudinal axis of the balance beam 21. This angularly disposed portion 39 of plate 36 is provided with an elongate vertically disposed aperture 40 through which projects the balance beam pointer 25. This apertured angularly disposed portion 39 of plate 36 permits the balance beam 21 to be moved relative thereto and also serves to limit the amount of vertical movement of the balance beam. Downward swinging movement of the balance beam 21 is limited by the lower edge of the aperture 40 while upward swinging movement thereof is limited by the upper edge of the aperture. The apertured angularly disposed portion 39 also serves as a guide means since not only is vertical swinging movement of the balance beam limited by this arrangement but lateral displacement of the beam is also prevented.

Means are also provided for stabilizing the balance beam 21 against oscillating movement during the weighing operation and for positioning the balance beam in a balance position. This stabilizer mechanism 41 is preferably of integral construction and may be formed from a suitable metallic material such as aluminum or the like. It will be seen that the stablizer mechanism 41 includes a substantially flat attachment plate 42 which is pivotally connected to the upstanding support member 14 by a pivot pin 43. Affixed to the lower terminal portion of the attachment plate 42 is a substantially flat, upper, beam pointer engaging element 44 which is rigidly connected at one end to a substantially flat, lower beam pointer and engaging element 45. It will be noted that these beam pointer engaging elements 44 and 45 are connected together in acutely angulated relation and cooperating with each other to define a substantially V-shaped socket member for engaging and restricting movement of the pointer 25.

Figure 2:
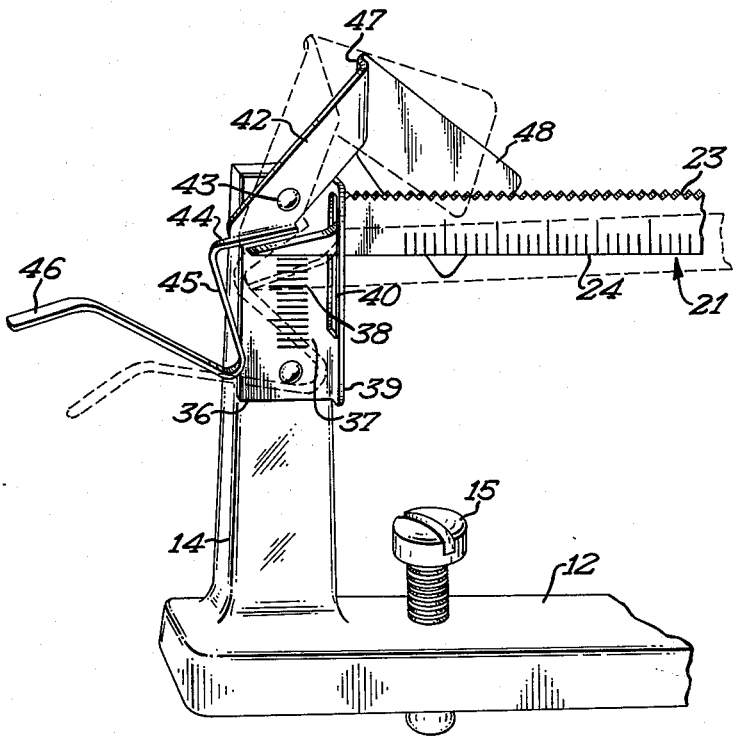
FIG. 2 is a fragmentary detailed side elevational view on an enlarged scale of this invention and being illustrated in an adjusted position by dotted line configuration.

The lower terminal portion of the lower beam pointer engaging element 45 has an elongate hand actuating element 46 affixed thereto and which may be gripped by a user to facilitate pivoting of the stabilizer mechanism. The upper terminal portion of the attachment plate 42 is laterally offset as at 47 and this laterally offset portion has integrally formed therewith a counter weight element 48. It will be seen that this counter weight element 48 serves as a means for normally urging the V-shaped socket member into the position illustrated in full line in FIGS. 1 and 2. It will also be noted that the lower inclined edge of the attachment plate 42 is normally urged into engagement with the upper edge of the angularly disposed portion 39 of plate 36.

When the tab 46 is grasped by a user and urged downwardly in the direction indicated by dotted line configuration, the pointer 25 will be engaged by the V-shaped socket element to thereby restrict oscillating movement of the balance beam 21. The stabilizer mechanism may be moved about pivot 42 until a lower terminal portion of the beam engaging element 45 engages the angularly disposed portion 39 of plate 36. When in this position, the apex of the V-shaped socket member will have then positioned the pointer element at the zero or reference indicia 38 so that the beam 21 is in a weight balancing position.

It has been found that through the use of this novel stabilizer mechanism 41, scale devices of the type illustrated may be very advantageously utilized for rapidly and accurately weighing a predetermined amount of material such as gun powder or the like. For example, in a reloading operation, the predetermined amount of gun powder must be accurately measured for use in loading each round. If several rounds are to be reloaded, it will be seen that the weighing operation must be repeated several times. Therefore, for example, if a scale mechanism 10 is used to weigh a predetermined amount of gun powder or the like, the scale mechanism is first levelled both laterally and longitudinally with respect to the surface upon which it is supported. Thereafter, the weights 34 and 35 will be properly positioned along the scale beam 21 to indicate the desired weight of the gun powder to be measured. With the weighing pan suspended from the end of the beam, the user places a quantity of powder in the pan while maintaining the V-shaped socket member of the stabilizer mechanism in engaging relation with respect to the balance beam pointer 25. Thereafter, when the actuator element 46 is released the V-shaped socket member will be urged out of engaging relation with respect to the balance beam pointer so that the balance beam may swing freely. The user will be apprised of whether too much or too little of the gun powder has been placed in the weighing pan by the balance beam pointer with respect to the reference indicia of the scale 37. A small amount may be added to the quantity of powder or removed therefrom within the weighing pan and during each of these successive weighting steps, the balance beam may be maintained in a weight balancing position by the stabilizer mechanism 41. Oscillating movement of the scale beam is thereby prevented and this permits very accurate weighing with the scale device. Further, the danger of the knife edge from becoming damaged from swinging of the scale beam is avoided since the beam will only move at most from a zero setting until the beam engages the stop means defined by the angularly disposed portion 39.

From the foregoing, it will be seen that there has been provided a novel stabilizer mechanism for use in conjunction with scale devices which permit a used to utilize the scale device with greater accuracy and a greater speed.

It will be noted that this novel stabilizer device may be readily secured to the conventional balance beam scale device such as those employed for measuring gun powder and the like and which requires no reconstruction of such a scale device.

It will, therefore, be seen that I have provided a novel stabilizer attachment for use in restricting the balance movement of a scale device against oscillating movement during the weighing operation and which also positions the balance beam in a weight balancing position.

It will therefore be seen that there has been provided a novel stabilizer mechanism, which is not only of simple and inexpensive construction, but which functions in a more efficient manner than any heretofore known comparable devices.

It will, of course, be understood that various changes may be made in the form, details, arrangement and proportions of the various parts without departing from the general scope of this invention.

What is claimed is:

1. In a scale device comprising a scale frame including a pair of spaced-apart upstanding support members,
- an elongate, substantially horizontally disposed weight-balancing beam pivotally mounted intermediate its ends on one of said supports for oscillating movement relative thereto,
- one end portion of said balance beam being tapered to define a pointer disposed in close proximity to the other of said support members,
- reference indicia means on said other support member for cooperating with said balance beam pointer for indicating a position of balance of the balance means,
- and balance beam stabilizer mechanism operable to stabilize the balance beam against oscillating movement during a weighing operation, said stabilizer mechanism including a pair of beam pointer engaging surfaces arranged in acutely angulated converging relationship, one of said surfaces being disposed in overlying relation with said beam pointer and the other of said surfaces being disposed in underlying relation with respect to said beam pointer, means pivotally mounting said stabilizer mechanism on said other support member for pivotal movement relative thereto between the beam pointer engaging and release positions about an axis extending substantially transversely of said balance beam, said angulated surfaces being disposed out of engagement with said beam pointer when in the released position and when pivoted to the beam pointer engaging position engaging the tapered beam pointer and restricting oscillating movement thereof while positioning the same in a weight balancing position.

2. In a scale device comprising a scale frame including a pair of spaced-apart upstanding support members, an elongate substantially horizontally disposed weight-balancing beam pivotally mounted intermediate its ends on one of said support members for oscillating movement relative thereto, one end portion of said balance beam being tapered to define a pointer disposed in close proximity to the other of said support members, reference indicia means on said other support member cooperating with said balance beam pointer for indicating a position of balance of the balance beam, and balance beam stabilizer means operable to stabilize the balance beam against oscillating movement during a weighing operation and including a pair of substantially flat, beam pointer engaging elements rigidly connected together in acutely angulated relation to define a substantially V-shaped socket member, means pivotally mounting said V-shaped socket member on said other support member for pivoting movement relative thereto between beam pointer engaging and release positions about an axis extending transversely of said balance beam, one of said beam pointer elements being disposed in overlying relation with said beam pointer and the other of said beam pointer engaging elements being disposed in underlying relation with respect to said beam pointer, said socket member when in said released position being disposed out of engagement with said beam pointer and when pivoted to the beam pointer engaging position engaging the tapered beam pointer in restricting oscillating movement thereof while positioning the same in weight balancing position.

3. The structure as defined in claim 2 and means for normally urging the socket member to the raised position.

4. The structure as defined in claim 2 and an actuator element connected to said V-shaped socket member for use in causing pivotal movement of the latter.

5. In a scale device comprising a scale frame including a pair of spaced-apart upstanding support members, an elongate, substantially horizontally disposed weight-balancing beam pivotally mounted intermediate its ends on one of said support members for oscillating movement relative thereto, one end portion of said balance beam being tapered to define a pointer disposed in close proximity to the other of said support members, stop means on said other support member engageable by said balance beam pointer for limiting the amount of oscillating movement of the balance beam, and balance beam stabilizer means operable to stabilize the balance beam against oscillating movement during the weighing operation and including a pair of substantially flat, beam pointer engaging elements rigidly connected together in acutely angulated relation to define a substantially V-shaped socket member, means pivotally mounting said V-shaped socket member on said other support member for pivoting movement relative thereto between beam pointer engaging and release position about an axis extending transversely of said balance beam, one of said beam pointer elements being disposed in overlying relation with said beam pointer and the other of said beam pointer engaging elements being disposed in underlying relation with respect to said beam pointer, said socket member when in released poistion being disposed out of engagement with said balance beam pointer and when pivoted to the beam pointer engaging position engaging the tapered beam pointer and restricting oscillating movement thereof while positioning the same in a weight balancing position, and counter weight means interconnected with said socket member and normally urging the same to the release position.

6. The structure defined in claim 5 wherein said stop means is engaged by said socket member when the latter is shifted to a beam pointer engaging position and cooperates therewith to properly position the balance beam in the weight balancing position during a weighing operation.

References Cited in the file of this patent

UNITED STATES PATENTS

| | | |
|---|---|---|
| 2,336,407 | Lynch | Dec. 7, 1943 |
| 2,981,348 | Hadley | Apr. 25, 1961 |
| 3,027,955 | McCown | Apr. 3, 1962 |

FOREIGN PATENTS

| | | |
|---|---|---|
| 12,791 | Great Britain | June 19, 1899 |
| 610,793 | Germany | Mar. 16, 1935 |